March 18, 1958 R. R. UNRATH 2,827,550
GAS SHIELDED NOZZLE FOR ARC WELDING HEAD
Filed Aug. 15, 1955
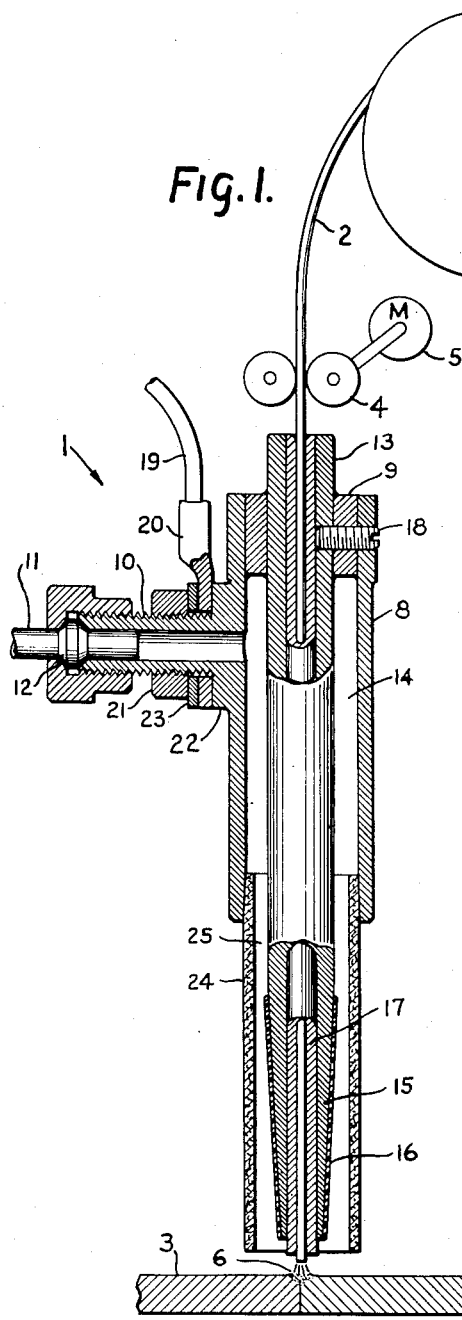
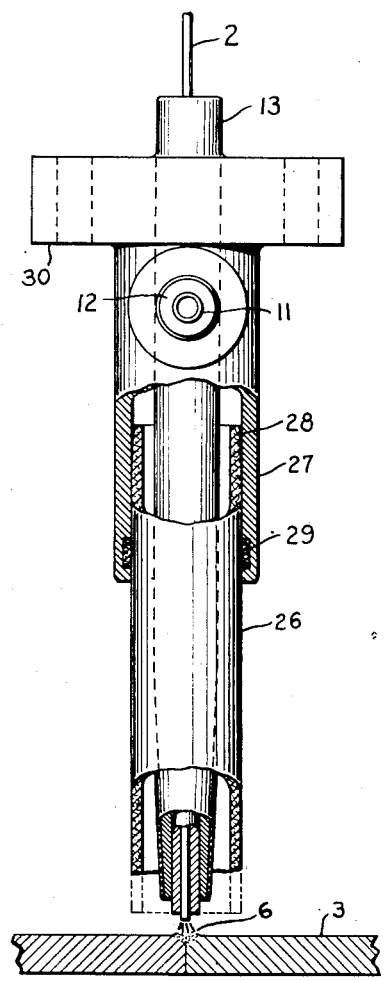
INVENTOR.
RALPH R. UNRATH
BY
Attorneys United States Patent Office 2,827,550
Patented Mar. 18, 1958

2,827,550

GAS SHIELDED NOZZLE FOR ARC WELDING HEAD

Ralph R. Unrath, Milwaukee, Wis., assignor to A. O. Smith Corporation, Milwaukee, Wis., a corporation of Wisconsin Application August 15, 1955, Serial No. 528,390

10 Claims. (Cl. 219—130)

This invention relates to an apparatus for automatic gas shielded arc welding and more particularly to a welding head having an improved nozzle for direction of the shielding gas to the arc.

With the relatively recent process of arc welding wherein a gas envelope is supplied about the arc, various electrode holders or heads have been developed having a nozzle for direction of the gas to the arc. Generally, the nozzle is either made of a ceramic or metallic material.

The ceramic nozzle is generally recommended for high frequency current welding to eliminate cross firing from the electrode to the nozzle. Normally, the ceramic nozzle is limited to manual arc welding.

In high amperage welding processes, roughly 250 amperes and higher, a water cooled metal nozzle is conventionally considered a necessity.

When employing a metal nozzle, spatter from the arc freezes to the nozzle. If the spatter is not removed from the nozzle, it eventually clogs the nozzle and interferes with the flow of shielding gas to the arc. The spatter is removed by hitting the nozzle with a hammer or the like and is a time consuming and therefore costly process. Eventually the nozzle is destroyed and must be replaced. As well as being relatively expensive to maintain, the initial cost of the water-cooled nozzle is quite substantial.

The use of carbon dioxide as the shielding gas results in a substantial increased spatter over other conventional gases and therefore, aggravates the problem discussed immediately preceding.

In accordance with the present invention, when employing the heavier shielding gases such as carbon dioxide, a nozzle is employed which is relatively readily disintegrated by the spatter from the arc. This is satisfactory because, contrary to the present belief, the nozzle does not always have to provide a close direction of the shielding gas. When the gas is relatively heavy, having a molecular weight greater than the surrounding atmosphere such as carbon dioxide, and certain other welding procedure is employed, the nozzle of the present invention is particularly suitable. To employ the nozzle, to be more fully described hereinafter, the other welding procedures generally required are a high rate of welding, a small weld bead width and a short duty cycle.

The drawing presented herewith illustrates the best mode presently contemplated for carrying out the invention.

In the drawing:

Figure 1 is an elevational view of an embodiment illustrating the invention, with parts thereof sectioned to more clearly show the invention; and Fig. 2 is a view similar to Figure 1 showing a second embodiment of the invention.

Referring to Figure 1 of the drawing, a welding head 1 directs a consumable electrode 2 to a workpiece 3 to be welded. The electrode 2 is fed through the head 1 by a pair of friction-drive feed rolls 4 which are driven by a feed motor 5. An arc 6 is struck between the electrode 2 and the workpiece 3 and is maintained by continuously feeding the electrode 2 from a reel 7 to the arc.

The welding head 1 comprises an outer tubular casing or shell 8 which is closed by a cover 9 which is brazed or otherwise suitably secured to the inner wall of the shell to make the joint therebetween gas tight. Adjacent the lower surface of the cover 9, a threaded gas inlet 10 is formed as an integral part of the casing 8 to introduce the gas in the upper portion of the casing.

The inlet 10 is connected to a suitable source of shielding gas, not shown, as by conduit 11. The conduit 11 is sealed to the gas inlet 10 as by a conventional flare-type fitting 12.

A tubular stiffening or strengthening member 13 is secured within an axial opening in cover 9 in any suitable manner; for example, brazing. The joint between the cover 9 and the stiffening member 13 is gas tight to make an annular gas passage 14 between the stiffening member 13 and the casing 8.

The lower end of the stiffening member 13 extends outwardly of the casing 8, as more fully described hereinafter, and terminates in spaced relation to the workpiece to reduce the weld spatter striking the stiffening member. The lower end portion of the stiffening member 13 is tapered as at 15 and provided with a smooth surface so that the weld spatter does not readily adhere thereto. Further, the tapered surface is periodically covered with a spatter-resistant coating 16 which further reduces spatter stickage.

The electrode 2 is guided in travel through the welding head by a copper contact tube 17. Tube 17 is removably secured within the stiffening member 13 as by a set screw 18 which is threaded into a transverse opening in the cover 9 and in the stiffening member 13. The copper tube 17 normally extends slightly beyond the end of stiffening member 13 and fits snugly therein to insure good electrical contact therebetween.

To connect the electrode 2 with a source of current, not shown in the drawing, an electrical cable 19 has a connector lug 20 surrounding the gas inlet 10. A nut 21 is threaded onto the inlet 10 and forces the lug 20 into close contact with a shoulder 22 of the casing 8 to insure good electrical contact. A washer 23 is placed between the nut 24 and the lug 20 in the usual manner.

The casing 8, cover 9 and stiffening member 13 are of an electrically conducting material and consequently complete an electrical path from the cable 19 and to the contact tube 17 and thereby provide current to the electrode 2. The electrical circuit is completed by connection of the workpiece 3 to the source of welding current.

To guide the shielding gas to the arc 6, an elongated tubular nozzle 24 is secured within the lower end of the casing 8 and extends concentrically downward about the stiffening member 13 to form an annular gas passage 25 connected with the gas passage 14. To reduce the radiant heat on the nozzle, its end terminates a short distance from the workpiece. The internal diameter of the nozzle 24 is substantially larger than the diameter of the electrode 1 and is therefore, not subjected to the intense heat in, and very near to, the arc.

The nozzle 24 is formed of a heat-resistant thermosetting resin which is reinforced by a fibrous material such as paper, glass, asbestos or the like.

The resin may take the form of a heat resistant polyester, phenolic, urea, silicone or melamine-type resin or an epoxy resin blend using a heat resistant curing agent.

Examples of the noted resins suitable for the nozzle are:

(1) *Polyester.*—The reaction product of a glycol, as propylene glycol, with a dibasic acid, as maleic acid, or a mixture of dibasic acids, such as blends of maleic and dibasic acids. This resinous reaction product is then copolymerized with a vinyl-type monomer, such as monomeric styrene, divinyl benzene, or triallylcyanurate to yield a thermosetting mass.

(2) *Phenolic.*—The reaction product of phenol, or a cresol, with formaldehyde in the presence of either acidic or basic catalyst, using formaldehyde in an amount sufficient to yield an infusible thermosetting polymer.

(3) *Urea.*—Formed by reacting urea with formaldehyde in the presence of either acidic or basic catalysts preferably using 1.1 to 2.0 moles of urea per two moles of formaldehyde.

(4) *Silicone.*—Formed, for example, by the reaction of an organic halogen compound with a silicon halide to yield an organo-silane or organosiloxane compound. The organic halogen compound is preferably chosen to contain some vinyl linkages or other reactive groups to provide points for cross-linking in the resultant polymer.

(5) *Melamine.*—The reaction product of dicyandiamide under heat and pressure subsequently reacted with formaldehyde to form an infusible mass.

(6) *Epoxy.*—The reaction product of bisphenol-A with epichlorohydrin subsequently reacted with a curing agent such as chlorendic anhydride or M-phenylene diamine.

A principal characteristic of the nozzle of the present invention is its combustion temperature. The combustion temperature should be above the temperature to which the nozzle is heated radiantly to prevent rapid burning of the nozzle. On the other hand, the nozzle combustion temperature should be below the temperature of the arc welding spatter which then burns or chars the nozzle. Due to this latter characteristic, the spatter does not tightly fuse to the nozzle, as in the case of a metallic nozzle and is, therefore, easily removed.

As the nozzle burns, it may give off gases which will be carried down to the weld with the shielding gas. Therefore, the nozzle material should be such that it will not decompose or react to produce gases injurious to the weld.

In a downhill welding procedure, the gas supplied for shielding is a relatively heavy gas having a molecular weight greater than that of the surrounding atmosphere; preferably carbon dioxide. With a heavy gas, the nozzle need only function to generally guide the gas toward the arc. The heavy gas then tends to float down around the arc. Consequently, with the heavy gas the nozzle 24 can be allowed to burn away for some distance from the arc before it has to be replaced.

If a lighter gas such as argon or helium were to be used instead of carbon dioxide or if an overhead weld were to be made, the gas would have to be passed through the nozzle with increased pressure so as to maintain the gas envelope about the weld area. This increases the gas flow and consequently the cost. Further, carbon dioxide is substantially less costly than other gases normally employed, such as helium and argon.

As the nozzle is combusted by the spatter from the arc, a high rate of welding and a small bead width should be employed. When the bead width is small, the molten puddle is small. Consequently, the nozzle is not in close proximity to the puddle.

As well as the prior named limitation, the duty cycle should be short so that the nozzle is not subjected to a continued heat from an arc for a long period.

As each of the prior named variables; namely, rate of welding, bead width, and duty cycle, vary with each other depending on the specific welding application, it is not possible to set forth definite limits for each except for a particular setting of the others. Thus, if the welding rate decreases, the duty cycle is decreased in order to limit the heat to which the nozzle is subjected.

An example of a suitable welding process employing the present invention follows:

A fillet weld was formed. A one-sixteenth inch diameter electrode was used with a current of from 380 to 400 amperes. The welding rate varied between 100 to 300 inches per minute with a duty cycle of approximately 6 seconds. Carbon dioxide was used as the shielding gas at a rate of 20 to 25 cubic feet per hour. The machine operated continuously on a three-shift per day basis.

The replaceable nozzle 24 employed had an internal diameter of one inch and a wall thickness of one-eighth inch. The nozzle was a paper melamine laminate.

In the above welding procedure, the nozzle life was from three to four days after which it was replaced. When replaced, the old nozzle was burned back approximately one inch.

As previously noted, the spatter, if any does adhere, is easily removed from the fiber nozzle of the present invention. The replacement of the fiber nozzle is also a very simple and rapid operation. In contrast to this, it is difficult to remove spatter from a water cooled nozzle and it can usually be removed only by hammering or grinding; this frequently damages the nozzle.

A second embodiment of the invention, shown in Fig. 2 is the same as that shown in Figure 1 except that the nozzle 26 can be manually fed down toward the arc.

The nozzle 26 slides into the casing or shell 27 and as it burns off or the like, it is periodically pulled out to dispose its outer end to the original position, as shown in dotted lines. This provides a nozzle of somewhat longer life. The upper end of the nozzle is ground to a taper as at 28 to allow it to slide into the casing 27 and past an annular packing 29. The yielding packing 29 is sealed within a recess in the shell and seals the space between the adjoining surfaces of the shell 27 and nozzle 26 to prevent the escape of shielding gas therebetween.

Fig. 2 is a view of the welding head showing transversely extending lugs 30 which are used in attaching the head in position. The lugs 30 are not shown in Figure 1.

The operation of the second embodiment is the same as the first embodiment, previously described, and therefore, no further description is given.

The present invention provides a nozzle which is easy to maintain and low in initial cost. As the combustion temperature of the nozzle is lower than the temperature of the spatter of the arc, the spatter will not adhere to the nozzle to the extent that spatter normally adheres to a metallic nozzle and thus the passage 25 through which the shielding gas is conducted will remain open and free of spatter for longer periods.

Various modes of carrying out the invention are contemplated within the scope of the accompanying claims particularly pointing out and distinctly claiming the subject matter regarded as the invention.

I claim:

1. A tubular welding head nozzle adapted to be disposed substantially within the space adjacent an arc containing spatter created by the arc and connected to a source of shielding gas to direct a stream of shielding gas to the arc for automatic, high speed arc welding of the character described which is composed of a heat resistant thermosetting resin selected from the group consisting of polyester, phenolic, urea, melamine, silicone and epoxy, said epoxy using a heat resistant curing agent, said nozzle preventing build up of arc spatter on the nozzle.

2. A tubular welding head nozzle adapted to be disposed substantially within the space adjacent an arc containing spatter created by the arc and connected to a source of shielding gas to direct a stream of shielding gas to the arc for automatic, gas shielded arc welding of the character described, which comprises a heat resistant thermosetting resin selected from the group consisting of a heat resistant polyester, phenolic, urea, melamine, silicone and epoxy, said epoxy using a heat resistant curing agent and a fibrous reinforcement for the resin, said nozzle preventing build up of arc spatter on the nozzle.

3. In a welding head for automatic high speed arc welding having a gas shielding nozzle composed of a fibrous reinforced resin, said resin having a combustion temperature less than the temperature of the arc spatter whereby said resin is burned by said spatter to prevent the build-up of spatter on the nozzle and to facilitate removal of the spatter from the nozzle.

4. In a welding head for automatic high speed arc welding having a nozzle adapted to be disposed substantially within the space adjacent an arc containing spatter created by the arc and to direct a relatively heavy shielding gas to the arc, said nozzle being formed of an organic composition characterized by being resistant to the radiant heat of the arc and being disintegrated by contact with the spatter from the arc.

5. In a welding head for automatic gas shielded arc welding of a workpiece, a tubular nozzle to direct carbon dioxide gas to the welding arc, said nozzle being composed of a heat resistant thermosetting resin characterized by being combustible when contacted by the arc welding spatter and being resistant to the radiant heat from the arc, and said resin being reinforced by a fibrous material to give strength to the nozzle.

6. In an arc welding head for automatic, high speed arc welding of the character described, a nozzle defining an annular shielding gas passage about an electrode, said nozzle being composed of a heat resistant resin having a combustion temperature less than the temperature of the weld spatter whereby the tendency of the weld spatter to stick to the nozzle is reduced and the weld spatter is easily removed from the nozzle, and said combustion temperature being above the temperature to which the nozzle is heated by radiant heat from the arc.

7. In a tubular welding head for gas shielded, consumable electrode arc welding wherein carbon dioxide is the shielding gas, an outer casing having a gas inlet adapted to be connected to a source of carbon dioxide, means to guide a consumable electrode downwardly to the work, means to substantially seal the top of the casing, a sliding contact engaging the electrode and connected to a source of current to maintain an arc between the electrode and the work, and a tubular reinforced heat-resistant resinous nozzle removably secured to the casing with said consumable electrode passing through the nozzle, said nozzle directing the shielding gas from the casing to the arc between the electrode and the work, and said nozzle having a combustion temperature above the temperature to which the nozzle is heated radiantly by the arc and below the temperature of the arc weld spatter.

8. In an arc welding head for automatic high speed arc welding, a tubular nozzle defining a passageway terminating adjacent the arc and composed of an organic material characterized by being resistant to the radiant heat of the arc and being combustible by contact with the spatter from the arc, and means for introducing carbon dioxide into said nozzle and directing the same through the passageway toward the arc.

9. In an arc welding head for automatic high speed arc welding, a tubular nozzle defining a passageway terminating adjacent the arc and composed of an organic material characterized by being resistant to the radiant heat of the arc and being combustible by contact with the spatter from the arc, and means for introducing a shielding gas into the nozzle with said gas passing through said passageway toward the arc, said gas having a molecular weight greater than that of the surrounding atmosphere.

10. In an arc welding head for automatic high speed arc welding, supporting structure, a tubular nozzle defining a passageway terminating adjacent the arc and being composed of an organic material characterized by being resistant to radiant heat of the arc and by being combustible by contact with the spatter from the arc and thereby burn away, coupling means connecting the nozzle to the supporting structure and allowing axial positioning of the nozzle with respect to the supporting structure to maintain the passageway terminating adjacent the arc after the nozzle is burned away, and means for introducing carbon dioxide into said nozzle and directing the same through the passageway toward the arc.

References Cited in the file of this patent

UNITED STATES PATENTS

| 1,552,369 | White | Sept. 1, 1925 |
| 1,746,207 | Alexander | Feb. 4, 1930 |
| 2,606,267 | McElrath | Aug. 5, 1952 |

FOREIGN PATENTS

| 303,350 | Switzerland | Feb. 1, 1955 |